Nov. 12, 1935.　　　　E. G. ULRICH　　　　2,020,386
TRUCK ANCHOR
Filed Jan. 11, 1934　　　　3 Sheets-Sheet 2
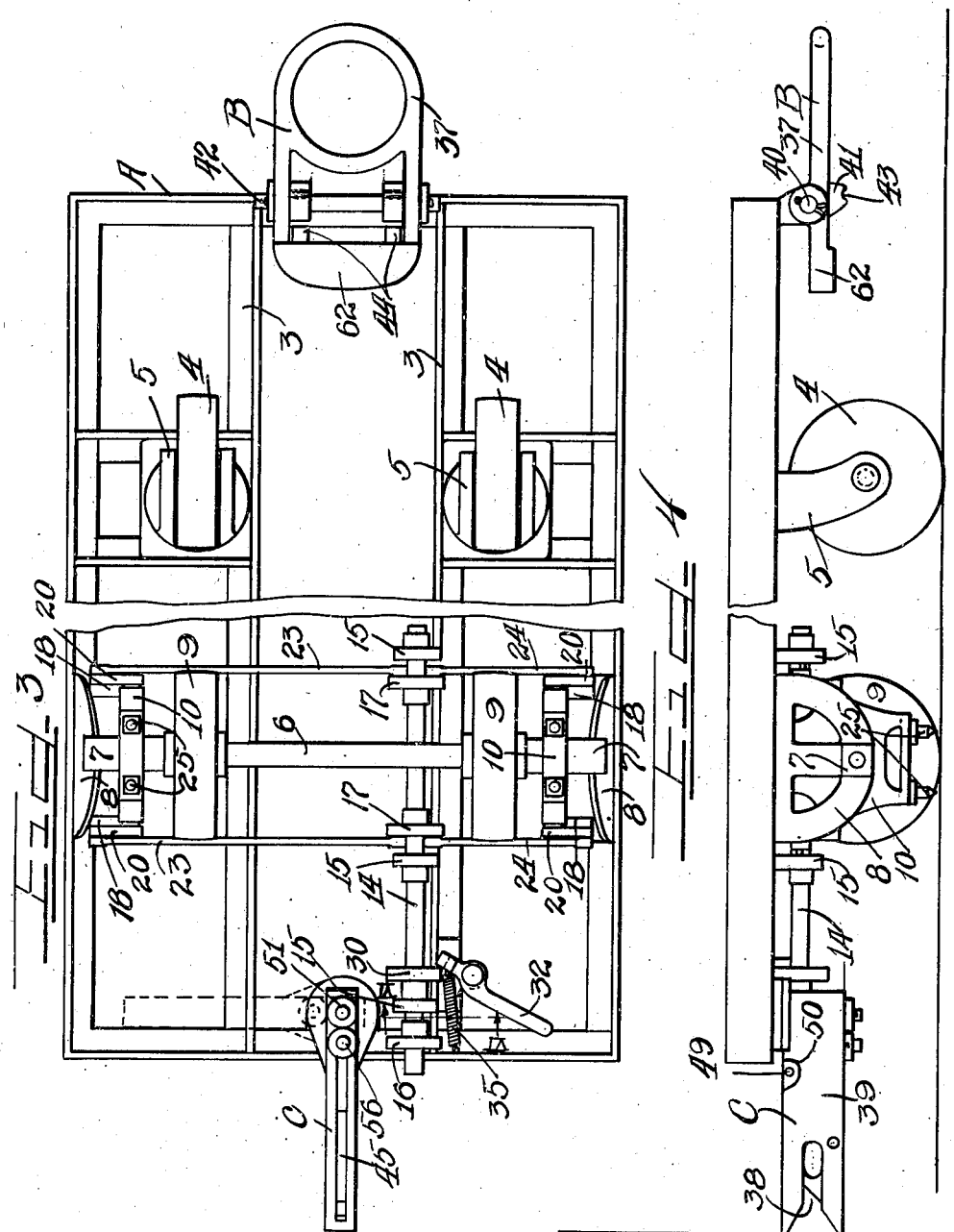
Inventor
Emery Gene Ulrich Nov. 12, 1935.  E. G. ULRICH  2,020,386
TRUCK ANCHOR
Filed Jan. 11, 1934  3 Sheets-Sheet 3
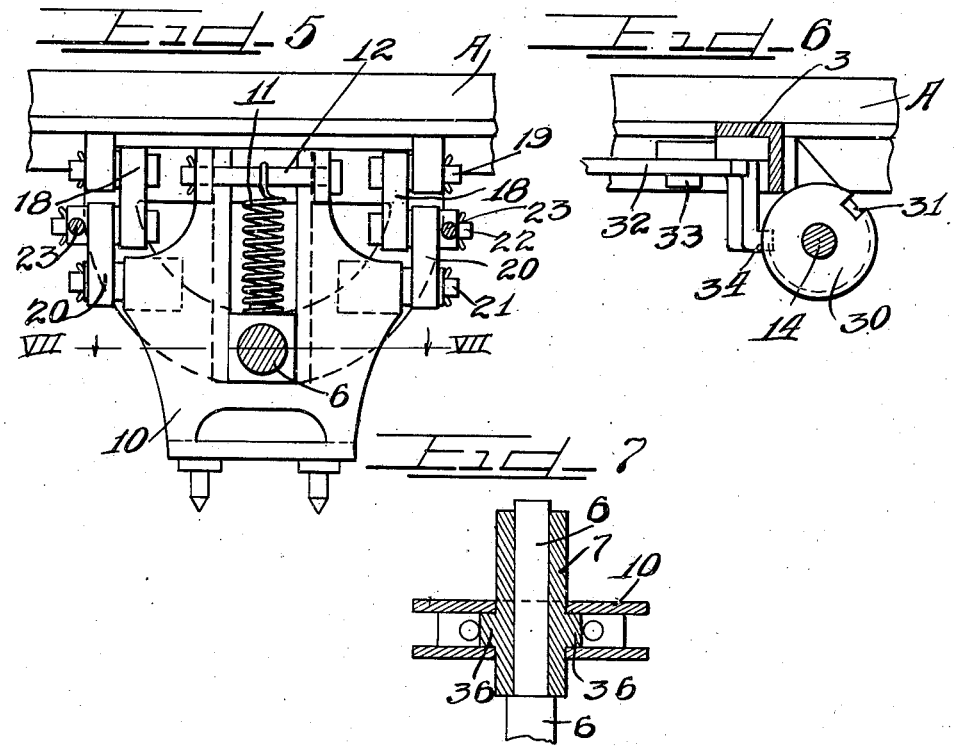
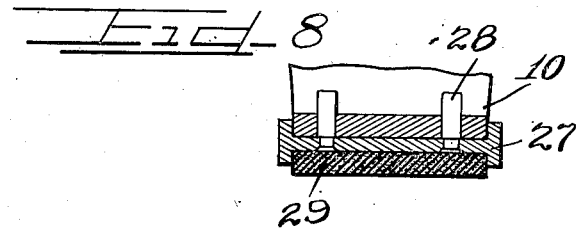
Inventor
Emery Gene Ulrich
By Charles A. Wills Attys.

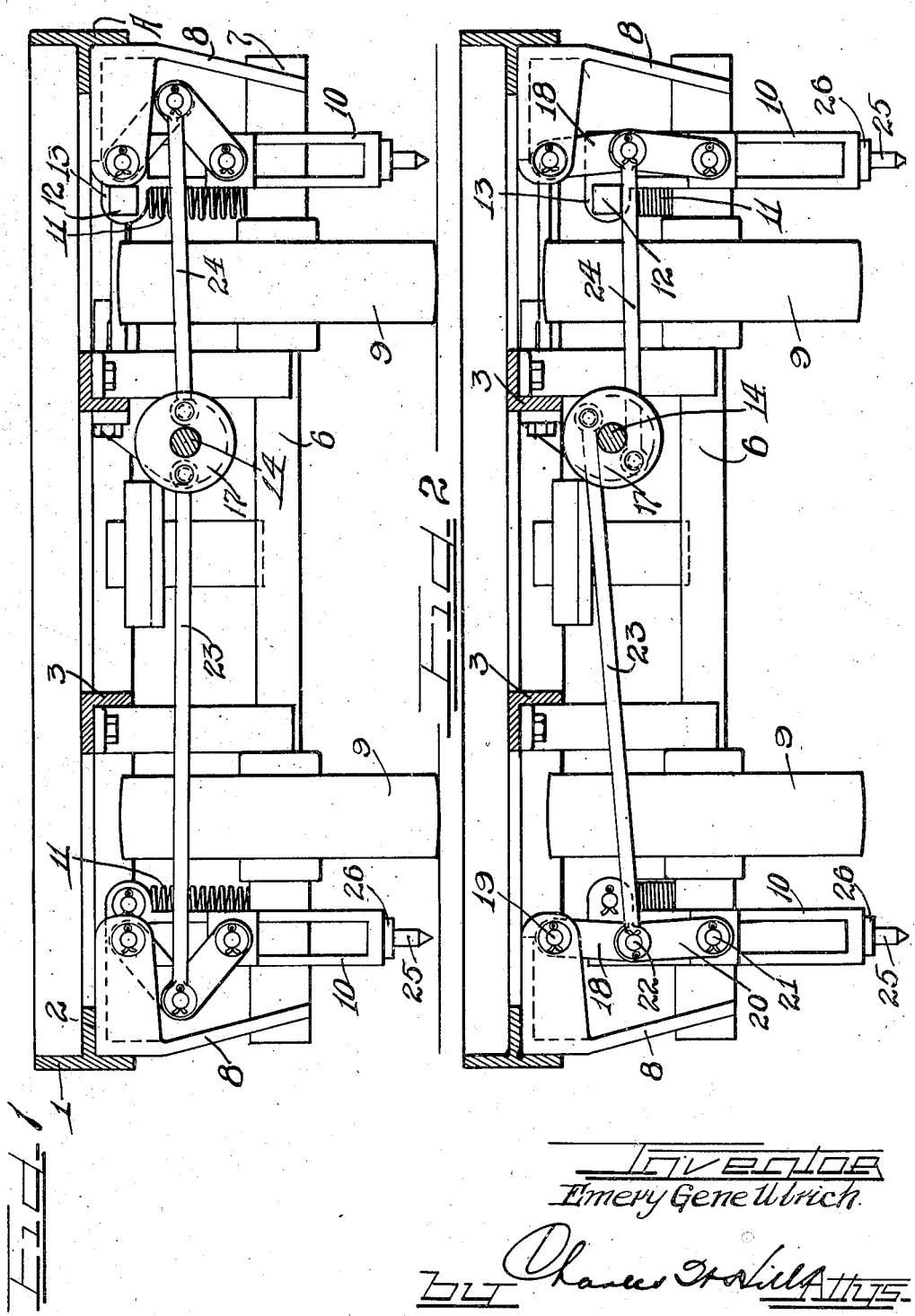

Patented Nov. 12, 1935

2,020,386

UNITED STATES PATENT OFFICE 2,020,386

TRUCK ANCHOR

Emery Gene Ulrich, Cleveland, Ohio

Application January 11, 1934, Serial No. 706,167

5 Claims. (Cl. 188—7)

This invention relates to trucks and more particularly to freight house trucks of the type used for moving freight and merchandise in warehouses, freight depots and the like, and which trucks are provided with couplers for coupling together a plurality of trucks in trains. The trucks are also used for transporting freight and merchandise which is loaded onto the trucks at a point of origin and the loaded trucks are then loaded into freight cars or onto ships, conveyed to destinations, and unloaded at the destination, without any of the freight or merchandise being removed from the trucks at any time.

In connection with such use of these trucks, it is highly desirable that means be provided for preventing shifting of the trucks particularly when loaded into freight cars and which anti-shifting means must necessarily be efficient in use and expedient to operate.

The present invention has to do with means for anchoring the trucks of particularly the freight house type against shifting or displacement particularly when loaded into freight cars or onto decks of ships.

An object of the present invention is to provide means for anchoring freight house trucks against shifting when loaded into freight cars or on decks of ships.

Another object of the invention is to provide anchoring means for freight house trucks which elevate the wheel supports at one end of a truck from a floor and thereby prevent shifting of the truck.

A further object of the invention is to provide anchoring means for trucks of the freight house type which means are provided with parts for engaging a floor in such manner as to prevent shifting of the trucks.

Another and yet further object of the invention is to provide trucks of the freight house type with means on the trucks for raising the wheels at one end thereof, which means may be released from raised position without the use of tools, accessories or the like and which raising means may be actuated with but a single handle for any number of trucks.

Generally speaking, the raising mechanism contemplates the provision of slides adjacent the wheels at one end of a truck together with means for lowering the slides to raise the wheels off the floor and to lock the slides in downward or extended position. The invention further contemplates release means for the slides, which release means may be actuated without any tool or instrumentality of any sort and which may be installed on the truck in readily accessible position.

The above, other and further objects of the invention will be apparent from the following description, accompanying drawings, and appended claims.

Various aspects of the present invention are illustrated in the accompanying drawings, and the views are as follows:

Figure 1 is a transverse sectional view through a freight house truck provided with anchoring means embodying principles of the present invention, and showing the anchoring means in retracted or raised position.

Figure 2 is a view similar to Figure 1 of anchoring means lowered or extended and showing the truck wheels raised from the floor.

Figure 3 is a fragmental bottom plan view of a freight house truck equipped with the anchoring means embodying principles of the present invention, and showing in full lines the positions of the couplers when arranged for coupling, and in dotted lines, one of the couplers swung out of the way.

Figure 4 is a fragmental side elevational view of the truck of Figure 3 and showing the coupler extended for coupling relation, and the anchoring means retracted or raised.

Figure 5 is a side elevational view of one of the anchoring means embodying principles of the present invention and showing the wheel axle in section.

Figure 6 is a fragmental view, partially in section, and taken substantially in the plane indicated by the line VI—VI of Figure 3, showing one form of latch means.

Figure 7 is a horizontal sectional view taken substantially in the plane of line VII—VII of Figure 5, and showing a fragmental portion of the wheel axle.

Figure 8 is a fragmental vertical sectional view through one of the slides of the anchoring means showing another form anti-skid surface for engaging a car floor or ship deck to prevent shifting of the trucks on the same.

The drawings will now be explained.

A truck frame, designated generally at A, defines the outline of the truck and is herein illustrated as having a vertical flange 1 and a horizontally extending flange 2 at substantially mid-height of the vertical flange 1. Angle irons 3 connect the ends of the frame A for strengthening purposes.

Near one end of the truck body are pivoted castor wheels 4 carried in yokes 5 which are pivotally connected to the frame of the truck. These wheels are freely pivotal as is customary in trucks of the freight house type.

Near the rear end of the truck body, a shaft 6 is carried in suitable bearings 7 suitably supported in depending webs 8 fastened to the truck frame A. On the shaft 6 are the rear wheels 9.

Adjacent each of the rear wheels 9, and preferably outwardly thereof are vertically arranged slides 10 which are guided on part of the web structure 8. The slides 10 are normally maintained in retracted or raised position by suitable means, springs 11 being herein illustrated for such purpose. The springs 11 are shown as coil springs with the upper ends thereof suitably secured to the slides 10, being attached thereto by cross pins 12 carried in laterally extending lugs 13 and with the lower ends of the springs engaging the suitable portion of the bearings 7. Figure 1 illustrates the slides 10 in retracted or raised position and with the springs 11 expanded while Figure 2 shows the slides in extended or lowered position with the springs 11 compressed.

While any suitable means may be provided for lowering or extending the slides 10, there is herein illustrated as such means, a shaft 14 extending lengthwise of the truck with one end available at the rear end of the truck and the opposite end terminating a short distance forwardly of the rear wheels 9. The shaft 14 is carried in suitable bearings 15 fastened to the frame structure of the truck. The outer end of the shaft 14 may be polygonal shape for receiving an operating lever for rotating the shaft, or in lieu thereof, a disc 16 may be secured to this shaft 14 adjacent its outer end, which disc is provided with apertures for receiving lugs on an operating handle. The disc 16 is keyed or otherwise secured to the shaft 14 for rotating it.

On the shaft 14, are provided axially spaced discs 17 constituting cranks and secured for rotation with the shaft 14.

For extending or lowering the slides 10, toggles are provided. The illustrated form of toggle comprises upper links 18 which are pivoted at the upper ends on pivot pins 19 secured in a part of the casting forming the webs 8 and the lower links 20, the lower ends of which are pivoted on pins 21 suitably secured to the slides 10. The other ends of the links 18 and 20 are pivoted together by pins 22. As herein illustrated, there are pairs of links 18 and 20 on each side of each slide 10.

For actuating the toggles, the pivotal points or pins 22 thereof are connected by links 23 and 24 with the discs 17 on the shaft 14. Because of the fact that the shaft 14 is placed off center with respect to the discs between the wheels 9, the links or rods 23 are longer than the links or rods 24.

Normally, the slides 10 are in retracted or raised position, as illustrated in Figure 1 of the drawings.

When it is desired to lower or extend the slides 10, a suitable tool, such as a crank or lever, is applied to the outer end of the shaft 14 and the shaft rotated in clockwise direction as viewed in Figures 1 and 2. Rotation of the shaft 9 thereupon causes rotation of the discs 17 thus moving the ends of the links or rods 23 and 24 connected to such discs, in clockwise direction and moving the links or rods 23 and 24 from the straight-line position of Figure 1 to the position of Figure 2. Movement of the links in the manner described extends the toggles thus lowering or extending the slides 10 to raise the wheels 9 from the floor and anchor the rear end of the truck.

In order to prevent shifting of the truck when its rear wheels have been raised from the floor, various means may be provided.

In certain figures of the drawings the lower ends of the slides 10 are shown as provided with pointed pins 25 which in fact are bolts having the ends pointed and which are secured in the lower faces of the slides 10 by means of lock nuts 26. The heads of the bolts are inwardly of the lower face of the slide 10 and the bolts may be removed by removing the lock nuts 26.

When the pointed bolts 25 are utilized for preventing shifting of the truck, when raised, the bolts enter the floor making holes in the floor, and thus effectively secure the truck against shifting. Even though the front wheels 4 are free to rotate about the axes of the yokes 5 and also about the axes of the wheels, yet, because of the fact that the rear end of the truck is firmly fixed against shifting by engagement of the pointed bolts 25 with the floor, no shifting of the truck results.

It is sometimes desirable to use anti-skid means, other than the pointed bolts 25, where it is undesirable to puncture the floor on which the trucks are to be stowed.

Figure 8 illustrates one form of anti-skid shoes which may be used as a substitute for the pointed bolts 25, and there as illustrated includes a plate 27 which may be secured against the outer faces of the ends of the slides 10 by means of bolts 28. The outer faces of the plate 27 are provided for suitable anti-friction material 29 such as rubber, composition matter, or the like, in fact anything which will serve to prevent shifting of the slides with respect to the floor.

For locking the slides in extended or lowered position, there is herein utilized a disc 30 which is securely fastened to the shaft 14, and which disc has a notch 31 in it. A latch, consisting of a lever 32, is pivoted on a pin 33 secured in the frame structure of the truck, and with a detent 34 adapted to engage the notch 31 in the disc 30 when the shaft 14 has been rotated a sufficient distance to fully extend or lower the slides 10. A spring 35 is provided to cause the detent 34 on the latch 32 to snap into engagement with the notch 31 of the disc 30 when the slides have been lowered a proper distance to raise the wheels 9 from the floor. All that is necessary to be done to release the latch, is for an attendant to reach underneath the truck and swing the lever 32 in a direction to disengage the detent 34 thereof from the notch 31 in the disc 30 whereupon the weight of the truck will cause the wheels 9 to descend against the floor and the springs 11 will thereupon come into play to raise or retract the slides 10 to their upward limit of movement. Such retraction of the slides 10 breaks the toggles and moves the links to the position of Figure 1, from the position of Figure 2 and at the same time rotates the shaft 14 in counter-clockwise direction to restore the parts to normal position, that is, in position ready to be actuated to again raise the rear end of the truck.

While that end of the truck has herein been referred to as the rear end, adjacent which are the slides 10, and the other end has been described as the front end, adjacent which are the castor wheels 4, yet it is to be understood that this terminology is used merely for convenience and is not in any sense of the word to be construed as limitations.

In order to guide the slides 10 in vertical movement, the bearings 7 are provided with projections 36 which engage the inner surfaces of the guide members forming the slides 10, as illustrated in Figure 7.

From an observation of Figure 3, it will be observed that the couplers C and B may be swung out of the way, that is, out of operative position, by pivotal movement to thus enable stowing of a plurality of trucks in close contact, thus reducing waste floor space, and preventing damage to the couplers because of such stowing.

It will be observed that the present invention provides a ready, convenient and simple mechanism for anchoring one end of a freight house truck against shifting, which anchoring mechanism is carried wholly by the truck and which requires but a single tool to anchor any truck, which tool is removably applied to the extremity of the shaft 14 and wherein the anchoring mechanism may be released without additional tools or accessories, simply by movement of the latch lever 32 about its pivot to disengage the detent 34 thereof from engagement with the notch 31 of the disc 30 on the shaft 14, whereupon gravity and the springs 11 retract the slides 10.

Trucks made in accordance with the present invention enjoy extensive use by railroads for shipping LCL freight as a quantity of lading may be placed on a truck and the truck with the lading on it stowed in a freight car, transported to destination and there, manually or by means of a tractor pushed or drawn to its point of distribution, unloaded and the truck returned to the railroad for re-use.

Although I have described certain specific uses for the embodiment of the invention herein disclosed it will be understood that its use may be extended to all fields wherein it is desired to elevate the wheels of a vehicle at one end and provide wheel support means at the other end for any purpose whatsoever.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. A freight house truck provided at one end with means for elevating said end of the truck to raise the wheels at that end off the floor, said means comprising slide members carried by the truck, toggle means connected to said slide members, links connected to the pivotal points of said toggles, means for moving said links to extend the toggles and lower the slide members, latch means for maintaining said slide members in lowered position, an attendant-operable bar temporarily applicable to said lever moving means for actuating said slides to raise the truck end with the wheels off the floor, means carried by the truck and manually operable for tripping the latch means to thereby allow gravital descent of the wheels onto the floor, and means for retracting said slide members after latch release to clear the floor.

2. In combination with a freight house truck having wheels adjacent each end thereof, of means for raising the wheels at one end off the floor, said means comprising vertical slides, springs for retaining said slides in retracted or uppermost position, links connected to said slides and constituting toggles, crank discs, links connected to the toggle pivots and to said crank discs, a shaft connected to said crank discs, a lever removably applicable to said shaft to turn it in a direction to lengthen the toggle to thus lower the slides, a latch engageable to prevent retrograde movement of said shaft and crank discs, and means for tripping the latch.

3. In combination with a freight house truck having wheels adjacent each end thereof, of means for raising the wheels at one end off the floor, said means comprising vertical slides, springs for retaining said slides in retracted or uppermost position, pairs of links pivotally connected together and constituting toggles and having the other ends of the links connected respectively to the truck frame and slides, links connected to the toggle pivots, means for imparting lengthwise movement to said links for extending and retracting said toggles, and means for preventing retrograde movement of said last mentioned means when the same have been actuated to extend the links and lower the slides.

4. In combination with a freight house truck having wheels adjacent each end thereof, of means for raising the wheels at one end off the floor, said means comprising vertical slides, springs for retaining said slides in retracted or uppermost position, pairs of links pivotally connected together and constituting toggles and having the other ends of the links connected respectively to the truck frame and slides, links connected to the toggle pivots, an oscillatable shaft, crank means on said shaft, connections between said crank means and links for actuating said links and slides as the shaft is oscillated, means cooperating with said shaft to prevent retrograde movement thereof and the connected links and slides when said shaft is oscillated to project the slides to raise the truck end.

5. In combination with a freight house truck having wheels adjacent each end thereof, of means for raising the wheels at one end off the floor, said means including vertically movable slides, means for guiding said slides in vertical movement, toggle means for projecting the slides, links for actuating said toggle means, crank means for actuating said links, and means for locking said crank means against retrograde movement when the slides are projected.

EMERY GENE ULRICH.